(12) United States Patent
Tsien

(10) Patent No.: US 7,991,964 B2
(45) Date of Patent: *Aug. 2, 2011

(54) PRE-COHERENCE CHANNEL

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,599

(22) Filed: Jun. 24, 2010

(65) Prior Publication Data

US 2010/0262788 A1 Oct. 14, 2010

Related U.S. Application Data

(63) Continuation of application No. 11/221,616, filed on Sep. 7, 2005, now Pat. No. 7,769,956.

(51) Int. Cl.
*G06F 13/14* (2006.01)

(52) U.S. Cl. ...................................................... 711/141
(58) Field of Classification Search .................. None
See application file for complete search history.

(56) References Cited

U.S. PATENT DOCUMENTS

| 6,009,488 | A | 12/1999 | Kavipurapu |
| 6,735,675 | B2 | 5/2004 | Breuder et al. |
| 6,865,695 | B2 | 3/2005 | Joyner et al. |
| 2003/0126365 | A1 | 7/2003 | Jamil et al. |

*Primary Examiner* — Duc T Doan
(74) *Attorney, Agent, or Firm* — Blakely, Sokoloff, Taylor & Zafman LLP (57) ABSTRACT

A cache architecture to increase communication throughput and reduce stalls due to coherence protocol dependencies. More particularly, embodiments of the invention include multiple cache agents that each communication with the same protocol agent. In one embodiment, a pre-coherence channel couples the cache agents to the protocol agent to enable the protocol agent to receive events corresponding to cache operations from the cache agents to maintain ordering with respect to the cache operation events.

28 Claims, 6 Drawing Sheets

PRE-COHERENCE CHANNEL

CROSS REFERENCE TO RELATED APPLICATIONS

This application is a continuation patent application of U.S. patent application Ser. No. 11/221,616, filed Sep. 7, 2005 now U.S. Pat. No. 7,769,956 entitled "Pre-Coherence Channel" which names the same inventor as the present application.

FIELD OF INVENTION

Generally, embodiments of the invention relate to integrated electronics and integrated electronics systems. More specifically, embodiments of the invention relate to a technique and corresponding infrastructure to maintain order of events corresponding to operations for caching agents operating according to a caching protocol where the caching agents are separated from the protocol agents.

BACKGROUND

Computer systems and processor architectures, in particular, can use various types communication networks and protocols to exchange information between agents, such as electronic devices, within those systems and architectures. Multiple processing elements ("processing cores") in a microprocessor, for example, use caching agents to store, retrieve, and exchange data between the various cores of the microprocessor. Likewise, computer systems in which single or multiple core microprocessors are interconnected may use caching agents to store, retrieve and exchange data between the microprocessors or other agents.

In electronic networks, cached data is managed and exchanged according to certain rules, or "protocol," such that coherency is maintained among the various caches and the devices, such as processing cores, that use the cached data. Caching activity across these devices directly serviced by the caches, such as lookup operations, store operations, invalidation operations, and data transfer operations, can be managed by logic or software routine (collectively or individually referred to as a "cache agent"), such that cache coherency is maintained among the various caches and cache agents. Caching activity within or outside of a microprocessor, such as snoop resolution, write-backs, fills, requests, and conflict resolution, can be managed by logic or software routine (collectively or individually referred to as a "protocol agent"), such that coherency is maintained among the various cache agents and processing cores within the microprocessor and among agents external to the microprocessor. In some prior art multi-core or single-core processors, for example, the caching agent is coupled to a specific coherence protocol agent, which may be physically integrated within the caching agent to which it corresponds. This means that the same circuit and/or software routine may be responsible for implementing cache operations, such as requests, dirty block replacement, fills, reads, etc., as the protocol for managing these operations.

Figure 1:
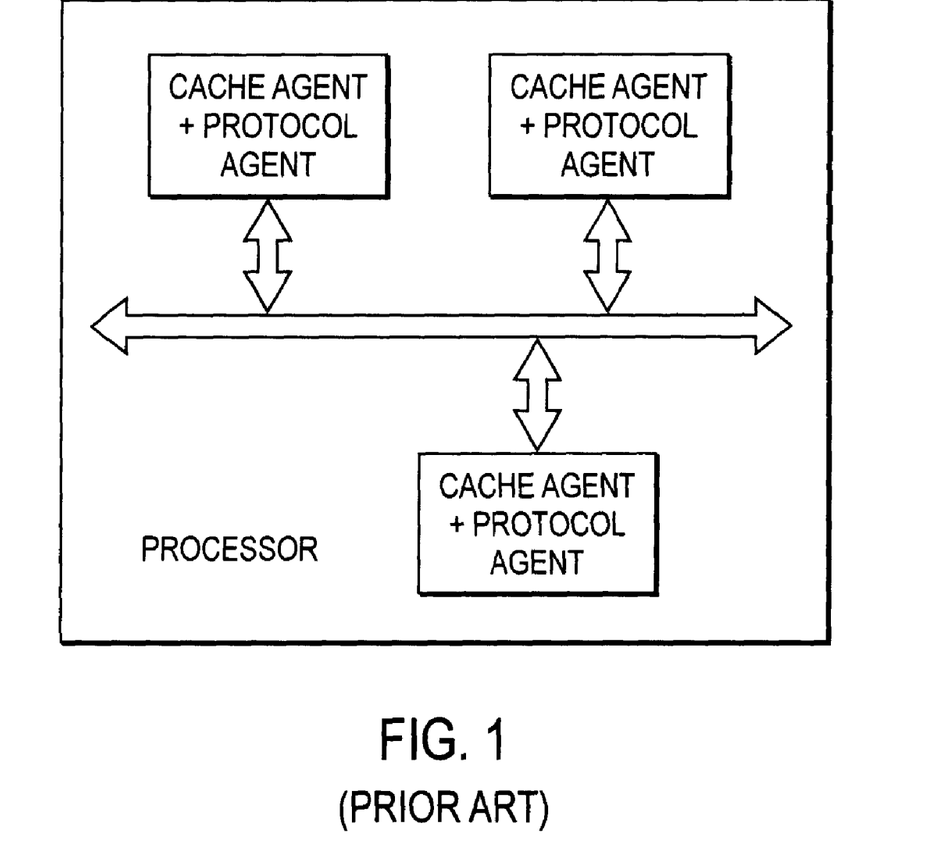
FIG. 1 illustrates a prior art caching architecture used within a microprocessor or computer system.

FIG. 1 illustrates a prior art microprocessor having a number of caching agents, each having circuitry to implement the caching protocol used among the caching agents of the microprocessor. In the prior art processor of FIG. 1, each caching agent is responsible for implementing and keeping track of the cache protocol as applied to itself. That is, each cache agent is coupled to a protocol agent, such that the same unit is responsible for both cache operations and the coherence protocol. Unfortunately, this "decentralized" caching protocol architecture requires redundant use of protocol logic and/or software to maintain the caching protocol among all caching agents within the processor or computer system to which the protocol corresponds. In the case of the protocol being implemented using complementary metal-oxide-semiconductor (CMOS) logic devices, this can result in substantial power consumption by the processor or system, especially in multi-core processors having a number of caching agents.

Furthermore, the prior art caching architecture of FIG. 1 may be somewhat bandwidth limited in the amount of caching traffic supported among the caching agents, as each caching agent has to share the same bus, cache agent ports, and cache agent queuing structure that facilitate communication among the various caching agents.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Embodiments of the invention disclosed herein describe a caching architecture that may be used in an electronic device, such as a single core or multiple core microprocessor, or an electronics system, such a shared bus computer system or a point-to-point (P2P) bus computer system. More particularly, one embodiment of the invention includes a caching architecture, in which the caching protocol is more centralized and decoupled from the caching agents to which the protocol corresponds than in some prior art caching architectures.

With cache agents and protocol agents being detached, a pre-coherence channel is used to ensure that the protocol agent is kept current with the coherence information from the cache agents. In one embodiment, the pre-coherence channel includes an on-chip, or local, interconnection network. In this manner, cache events may have their order maintained and the protocol agents have a view of the coherence of the cache(s) in the system.

In one embodiment, a cache agent can communicate with a protocol agent using two signals that operate in part of the pre-coherence channel: one signal ("AD") to communicate addressed caching operations, such as data and/or cache ownership requests, data write-back operations, and snoop responses with data for cache-to-cache transfers, from a cache agent, and one signal ("AK") to communicate non-address responses, such as cache fill acknowledgements and non-data snoop responses, such as a cache "hit" or "miss" indication. Furthermore, in at least one embodiment, each signal may transmit information in opposite directions within the same clock cycle. For example, AK may transmit a first operation, such as a request operation, to a first protocol agent during a first clock cycle in a first direction while transmitting a second operation, such as a write-back operation, to the first or a second protocol agent in the opposite direction during the same clock signal.

Figure 2:
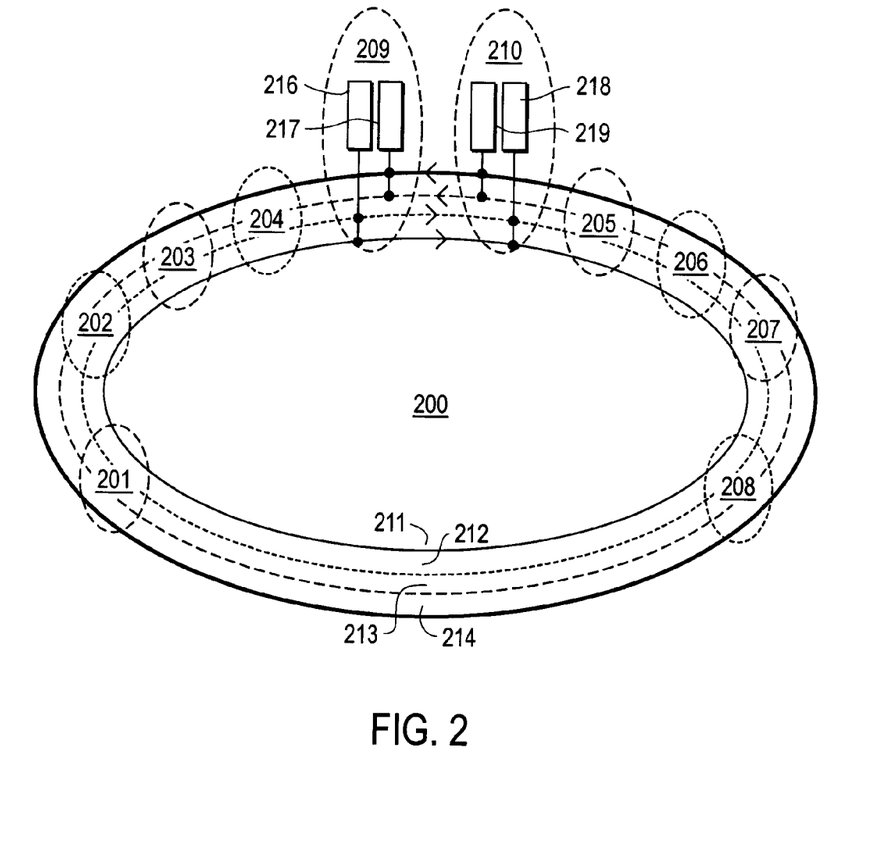
FIG. 2 illustrates a caching architecture according to one embodiment of the invention.

The concurrent bidirectional characteristics of the signals, AD and AK, can be conceptualized by two sets of cache agents, routing circuits, and a protocol agent interconnected by two signals, or "rings," transmitting an AK and AD signal, respectively, in one direction. FIG. 2, for example, illustrates one embodiment of a caching architecture, in which the two signals, AD and AK, are conceptualized as four rings, two of which are capable of transmitting information in a clockwise direction and two of which are capable of transmitting information in a counter clockwise direction. In particular, the caching architecture 200 of FIG. 2 depicts a first set of caching agents 201, 203, 205, and 207 that correspond to a first caching protocol agent ("protocol agent") 209 and a second set of caching agents 202, 204, 206, and 208 that correspond to a second protocol agent 210. Note that in alternative embodiments, only single separate rings are used for the AK and AD signals. In yet another embodiment, more than two rings are used for each of the AK and AD signals.

Each cache agent of the first set can communicate cache operations such as loads and stores to processing cores (not shown in FIG. 2), and data requests, data write-back operations, cache fill acknowledgements, and snoop response transactions, to the first protocol agent. Likewise, each cache agent of the second set communicates these non-data cache transactions to the second protocol agent. The cache agents may communicate to the protocol agents, in one embodiment, through a series of router circuit (not shown in FIG. 2).

The first and second protocol agents are responsible for arbitrating between the various operations from their respective cache agents such that the operations are managed and completed in a manner consistent with the caching protocol of the caching architecture.

In one embodiment, each cache agent has access to four communication channels (depicted by rings in FIG. 2) 211, 212, 213, 214, upon which caching transactions may be communicated. Each cache agent may communicate cache transactions on any of the four rings illustrated in FIG. 2. In other embodiments, each cache agent may be restricted to a particular ring or group of rings upon which caching transactions may be communicated to/from the cache agent. The cache data that results from the transactions communicated on the rings of FIG. 2 may be communicated among the cache agents on other communication channels (e.g., data bus) not depicted in FIG. 2. Alternatively, in some embodiments the cache data may be communicated on the rings depicted in FIG. 2. Moreover, in other embodiments, each network in FIG. 2 may be configured in other topologies, such as tree topology or a chain.

In the embodiment illustrated in FIG. 2, caching transactions, such as data and/or cache ownership requests, data write-back operations, and snoop responses with data are sent on rings 212 and 214 ("address" rings) and transactions, such as cache fill acknowledgements and non-data snoop responses, such as a cache "hit" or "miss" indication, are transmitted on rings 211 and 213 ("non-address" rings). In other embodiments, the above or other transactional information may be transmitted on other combinations of the rings 211-214. The particular ring assignment for the various cache transactions discussed above and illustrated in FIG. 2 are only one example of the transactions and ring assignments that may be used in embodiments of the invention.

As each set of cache agents communicates information between each other via the protocol agents, an ordering of the information entering the protocol agent can be maintained, in at least one embodiment, such that the correct information will allow correct coherence protocol transitions in the protocol agent at the correct time. In one embodiment, the ordering of information within the networks is maintained by each protocol agent. More specifically, in one embodiment, each protocol agent maintains the correct ordering of the various caching operations being performed by temporarily storing the operations as they arrive within each protocol agent and retrieving them in the order in which they arrived in order to produce correct coherence protocol transitions in the protocol agent.

In one embodiment, each protocol agent contains one or more buffers that may be used to store data, commands, or addresses originating from one of the cache agents, which can then be retrieved from the buffers in the proper order to be delivered to a particular cache agent. In the embodiment illustrated in FIG. 2, each protocol agent includes, or otherwise has associated therewith, two first-in-first-out (FIFO) buffers 216, 217, 218, 219 that are each coupled to two of the four rings of FIG. 2. Each pair of rings illustrated can communicate information in a particular direction. For example, rings 211 and 212 can communicate information in a clockwise (CW) direction, whereas rings 213 and 214 can communicate information in a counter-clockwise (CCW) direction. In an alternate embodiment, only a single FIFO is used and only two of the four rings are used.

Figure 3:
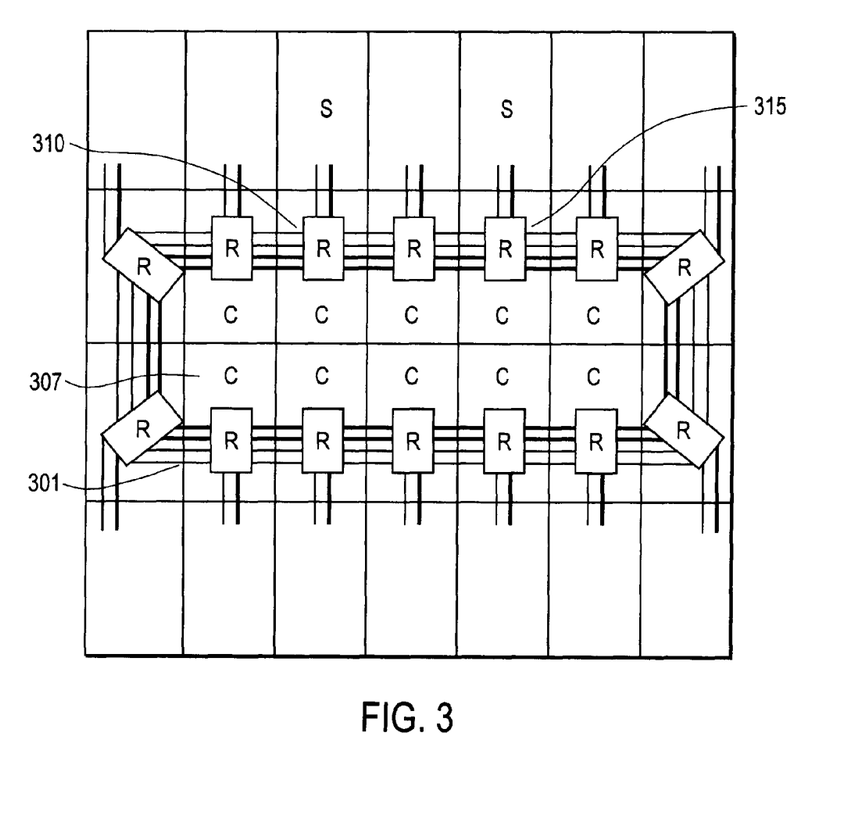
FIG. 3 illustrates a caching architecture including routing circuits according to one embodiment of the invention.

FIG. 3 is a diagram illustrating the ring structure of FIG. 2 in conjunction with various routing circuits, which route data to their intended recipient from each of the cache agents. In particular, FIG. 3 illustrates a number of cache agents, identified by the letter "C", in a ring configuration of two networks, each comprising signals AD and AK to interconnect a cache agent with a protocol agent, identified by the letter "S". A routing circuit, identified by the letter "R", is associated with each cache agent to either route information contained within signals, AD and AK, to the next cache agent within a network (if the next agent in the network is not a protocol agent) or to a protocol agent (if the next agent within the network is a protocol agent).

Two of the routing circuits 310 and 315 couple the rings of the networks in FIG. 3 to the protocol agents, whereas other routing agents connect the rings to other cache agents and other ring networks. In one embodiment, a cache agent 307 may send a signal intended for one of the protocol agents on ring 301 in a clockwise direction. The routing agents between cache agent 307 and the intended protocol agent, moving in a clockwise direction around the ring, propagates the information contained within the signal between them until the signal reaches the routing circuit, 310 or 315, which would route the signal to the intended protocol agent. For example, the signal described above would be retrieved by protocol agent 307 and the information within would be stored in the appropriate FIFO.

After information is stored within the FIFOs of a particular protocol agent, the protocol agent may process the cache events sent by the cache agent in accordance to the coherence protocol by retrieving, or "popping," the information off of the FIFO in the order in which it was stored.

Ordering Rules

As discussed above, because the cache agents (e.g., cache controllers) are separate from the protocol agent, the coherence ordering point is not at the same location, particularly since there is a non-one-to-one mapping between cache controllers and protocol engines with a variable latency Chip Multi Processor (CMP) network in between.

More specifically, a cache controller performs cache actions, such as requests, writebacks, snoops, and fills in an internal order, and when applied in a sequence to a single block in the cache, results in the data and state of the block to be updated in the order according to the specific sequence. This ordered sequence of cache events is important to correctly implement the coherence protocol. For instance, in one embodiment, the communication of correct cache ordering allows snoop responses and new requests to be seen in the correct order by the detached protocol agent, giving it the visibility into the internal ordering at the cache controller for these events, thereby ensuring that a snoop doesn't incorrectly get reordered behind a request and become blocked. The cache ordering point is where cache events, such as snoops, request, writebacks, and fills are ordered with respect to one another. The coherence ordering point is where coherence decisions are made from events specifically necessary to implement the protocol state transitions. These events include the cache events set forth herein, which are brought into the protocol agent in the correct cache event ordering via the pre-coherence channel, along with external coherence events, which reflect the communication of the coherence view from other protocol agents in the system.

In one embodiment, the cache ordering point is made to appear as if it's located inside the protocol agent, which is located in the system interface instead of the cache controller. To do that, information contained in the cache agent's ordering point is shifted into the coherence ordering point via the pre-coherence channel.

In one embodiment, the pre-coherence channel gives a protocol agent a minimal view into the internal ordering at the cache agents, allowing the protocol agent to function in a detached way without violating coherence rules in the coherence protocol. In one embodiment, it recognizes what type of ordered cache events are important and thus need to be communicated in the pre-coherence channel to the protocol agent. In one embodiment, the pre-coherence channel consists of an ordered mechanism to transport cache events from the cache agent into the protocol agent, and includes recovery and ignore mechanisms to allow a consistent coherence view of the system. The pre-coherence channel also includes a mechanism where resource dependencies are resolved by blocking the pre-coherence channel or moving the blockage to another FIFO to unblock the pre-coherence channel.

The use of pre-coherence channel ordering enables the cache agents to be detached from protocol engines. This provides a number of advantages such as, for example, the following advantages. First, it allows each protocol to be optimized for their own intended purposes (local protocol optimized for cache transfer performance, and off-chip protocol to support the complex conflict and coherence completion rules). Second, it modularizes the overall chip design. Third, it allows more effective resource sharing between the local cache agents in a multiple cache agent design. Fourth, the local protocol hides on-chip coherence operations from off-chip protocol, so off-chip bandwidth is saved.

In one embodiment, the pre-coherence channel is implemented as a virtual ordered route by which cache specific information is communicated from the cache agent into the specific logic that maintains the system interface's coherence ordering point, which is a request inflight table referred to herein as the missing address file (MAF), located in the protocol agent. Physically, this virtual route is implemented as the CMP network, and egress and ingress buffering on either side of the network within the cache and protocol agents respectively leading from the cache control logic to the MAF. The CMP network is the link and physical layers of the an on-chip communication consisting of the CMP address, acknowledgement, and data networks, between cache agents, processors, and protocol agents, shown as the collective of the bus network and its routing components in FIG. 3.

In one embodiment, the pre-coherence channel ordering is relaxed to allow a certain degree of out-of-ordering to lessen the restrictions on the CMP network in cases where reordering effects can either be (1) recovered, or (2) ignored because they do not cause the cache and protocol agent's states to diverge.

Since the protocol agent is apart from the cache agent, cache ordering needs to be communicated into the protocol agent. A set of rules is set forth herein by which a cache agent communicates the cache ordering into the protocol agent across a CMP network to a protocol agent.

In one embodiment, the following message types communicate the ordering point from the cache controller into the system interface: requests, writebacks, data (fill) acknowledgements, and snoop responses. These messages come into the protocol agent as a single input stream of events. From the dependency point of view, in one embodiment, they are classified into three types: simple flow dependency, cyclic resource dependency, and acyclic resource dependency.

For a simple flow control dependency, data acknowledgement and snoop responses do not require allocation of a resource in order to be consumed. In one embodiment, they both could potentially create home channel messages, which are sunk in preallocated buffers in the home node of the system, thus, not requiring additional dependency aside from message flow control. (The home node may be part of the memory controller in a system responsible for connecting each of the processors in the system to the memory controller, and these transactions are used to implement a coherence protocol in which these processors and the home node coupled to the memory controller jointly participate.)

For a cyclic resource dependency, requests depend on the allocation of a resource. In one embodiment, because resource sharing (as opposed to resource division) is allowed, a request may not have a free MAF entry to allocate. In order to make room for allocation, another entry needs to retire, and for that to occur, snoops need to make forward progress. If a request is blocking the input event stream, then snoop responses behind the request are prevented from making forward progress. As long as snoop responses are blocked, the protocol engine cannot complete requests, and request entries in the MAF will not retire, which is a deadlock condition. Request allocation depends on request forward progress, which depends on snoop forward progress, which depends on the event stream making forward progress, which is blocked by the request.

For acyclic resource dependency, writeback transactions also have a resource dependency on allocation into the MAF. While blocking on a MAF entry to become available, the input stream from the cache agent is also blocked. However, this is a benign resource dependency because writeback forward progress is not dependent on the any messages behind it, namely, a snoop response message following it from the cache agent. As long as there is a reserved writeback allocation path into the MAF, writebacks can achieve still forward progress even by blocking the input event stream.

Figure 4:
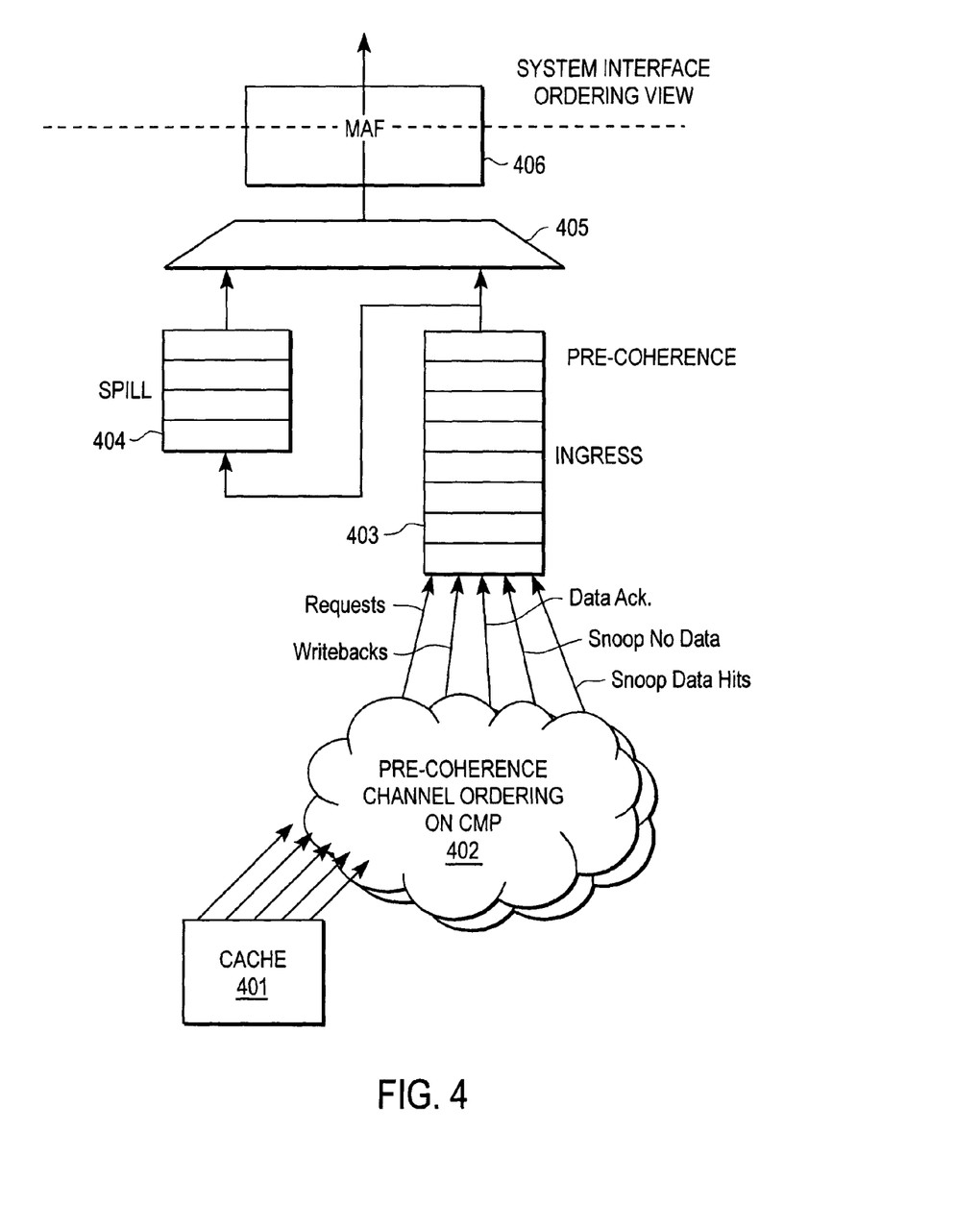
FIG. 4 illustrates a block diagram of one embodiment of message ordering logic to accommodate the various message types while ensuring proper ordering.

FIG. 4 is a block diagram of one embodiment of message ordering logic to accommodate the various message types while ensuring the proper ordering of the cache coherency events. In one embodiment, this logic is in the protocol agent. The ordering logic uses two separate FIFOs and includes the MAF.

Referring to FIG. 4, an incoming stream of events is impact into ingress queue (e.g., FIFO) 403. Such events are received from the pre-coherence channel ordering interface (e.g., rings) between the one or more protocol agents and one or more caches (e.g., cache agent 401) in the sets of caches. These events are received in the form of messages that include requests, writebacks, data acknowledgements, snoop no data messages, and snoop data messages.

The head of ingress FIFO 403 is coupled to one input of arbiter 405. In one embodiment, only the head of ingress FIFO 403 is allowed to arbitrate for input into MAF 406. In one embodiment, non-request events are allowed to block at the head of ingress FIFO 403 while waiting for resources, but if a request is at the head of ingress FIFO 403 and blocked, it is moved into spill FIFO 404 instead, thereby allowing the stream of events following it in ingress FIFO 404 to proceed to avoid deadlock. In one embodiment, the move is done by obtaining an issue slot by doing a poison issue when not all the resources are available. The poison issue is one which is interpreted as a nop elsewhere, but enables allocation into spill FIFO 404.

In one embodiment, spill FIFO 404 is preallocated with the total number of requests from all cache agents from which the protocol agent can receive. In one embodiment, unallocated requests have one way pre-coherence ordering with respect to the other messages. Thus, an unallocated request cannot shift forward in the pre-coherence channel but is allowed to move backwards. In other words, the protocol agent pretends the cache agent request was sent later than it was with respect to snoops following it. Additionally requests are out-of-order with respect to each other. Subsequently, arbiter 405 arbitrates between the outputs of ingress FIFO 403 and spill FIFO 404.

Thus, from the dependency point of view, requirements are made on the reordering of requests in comparison to all other events in the pre-coherence channel ordering. In these reordered cases, reordering is done on the pre-coherence channel where it would not have been allowed in at the system interface. These happen in cases where either the protocol agent is able to recover, or the reordered perception of events do not force the cache and coherence agents to diverge. The following matrix describes what may or may not be allowed to reorder in one embodiment:

standing request to an address in the system. This is provided so that the rejected second requires will be able to fairly arbitrate the next time.

(2) A request, writeback, or snoop response need to be ordered behind prior writebacks and snoop responses. In one embodiment, out-of-order events between cache and protocol agents for these event sequences cannot be changed to make a coherent series of events through pre-coherence channel architecture efforts, so they are disallowed.

(3) A snoop response or writeback following a matching request are required to be able to pass ahead of a blocked request to avoid deadlock.

(4) In one embodiment, a data acknowledgment could trigger the coherence protocol to enter a conflict phase, if earlier snoop responses have resulted in conflict against the same transaction receiving the data acknowledgements. Therefore, the correct ordering of snoop responses versus data acknowledgement is communicated on the pre-coherence channel to ensure conflicts are properly detected to allow entrance into conflict phase.

(5) In one embodiment of the coherence protocol, cache replacements and snoops on the returned data are allowed to occur in the cache agent prior to the coherence agent completing the transaction. These are allowed to merge into the active transaction and activate once the transaction is complete. Thus, the pre-coherence channel ordering allows these to be reordered ahead of the data acknowledgement, so that they merge into the transaction before it is potentially completed by the data acknowledgement. A recovery method is used to buffer early extracted data from writebacks and snoop data hits and unbuffer and covert to writebacks after completion of the request.

(6) These cases are only for fetch type requests, for which the peer agent is only obligated to give a recent (non-infinitely-stale) version of the data. A snoop response can be unordered with a writeback or another snoop response to return an almost current data.

(7) A snoop miss passed by a request is registered as a conflict, which is an ignored side-effect.

(8) These could only happen in the following sequence: snoop miss->data ack.->writeback or snoop hit. In one embodiment, the fill operation occurs in the middle. One pre-coherence channel implementation relies on the MAF to buffer the writeback or snoop hit into the inflight request waiting for the data acknowledge, and then recovering through unbuffer and conversion to writeback.

The ordering requirements may be hardened in an implementation to make unordered relations ordered, but the table

| X followed by Y | Request | Writeback | Snoop Data Hit | Snoop No Data | Data Ack. |
| --- | --- | --- | --- | --- | --- |
| Request | Unordered(1) | Ordered(2) | Ordered(2) | Unordered(7) | Unordered(1) |
| Writeback | Must allow reorder(3) | Ordered(2) | Unordered(6) | Unordered(8) | Unordered(5) |
| Snoop Data Hit | Must allow reorder(3) | Ordered(2) | Unordered(6) | Unordered(8) | Unordered(5) |
| Snoop No Data | Must allow reorder(3) | Ordered(2) | Ordered(2) | Ordered(2) | Unordered(5) |
| Data Ack. | Impossible | Impossible | Ordered(4) | Ordered(4) | Impossible |

(1) Multiple requests to the same address can be inflight from the cache agent, or a new request could come from the cache agent before the old one has been retired. In one embodiment, a CAM is implemented in the protocol agent to serialize the requests and guarantee there's only one out-above defines the loosest relations between the messages that must travel on the CMP network into the coherence point in MAF 406. Additionally, the request dependency requirements are satisfied in all parts of the network to avoid request deadlock.

In one embodiment, ingress FIFO 403 and spill FIFO 404 in the system interface could be part of the CMP network. All requests, writebacks, snoop responses, and data acknowledgements are explicitly made ordered in the FIFO, even though the pre-coherence channel does not require all of them to be ordered. Request dependency is fixed through spill FIFO 404, which then allows requests to be unordered amongst requests to take advantage of rule 1.

In one embodiment, the interconnect is a network of rings optimized for cache transfer between cores and caches. In one embodiment, there are three different types of ring networks to facilitate this: address, no-address, and data. In one embodiment, every message is one phit in length and the three ring networks exist to balance the message load between the rings. For instance, a read request on address is balanced by a cache response on data. Each of the ring networks is arbitrated separately. A ring guarantees point-to-point ordering, but ordering across different rings can be skewed, so keeping ordering across ring networks means ordered injection into the ring networks from a source.

To benefit most from the out-of-orderness allowed by the pre-coherence channel on this rings-based architecture, messages are split across address and no-address networks in the following way. Requests, writebacks, and snoop data hits are placed on the address network, and snoop no data and data acknowledgements are placed on the no-address network. Messages on each network are ordered between themselves. Two rings allow bandwidth to be doubled. In one embodiment, address ring injection does not need to be ordered with no-address ring injection, but the reverse requires order. That is, an address can pass no-address but not vice-versa.

Once into the protocol agent, all messages are piled into ingress FIFO 403 in the order they're received, which is the order the cache agent intends. No further reordering of messages occur in ingress FIFO 403 as they are pulled out and sent to be issued into MAF 406 in order under control of arbiter 405. The out-of-orderness introduced on the ring network, but sill complying to the pre-coherence channel ordering, is reflected in ingress FIFO 403, along with request out-of-orderness, which is introduced local to the system interface at the FIFO 404, through arbiter 405 across the FIFOs into MAF 406. The sum of out-of-orderness seen at MAF 406 is either corrected with special effort in the protocol agent such as rules 5 and 8, or rationalized away to not affect the overall picture of the coherence protocol as in rules 1, 3, 6, and 7, in one embodiment of an implementation of a coherence protocol at MAF 406. From that point on, messages travel on the coherence channel on or off-chip between protocol agents in the system.

Figure 5:
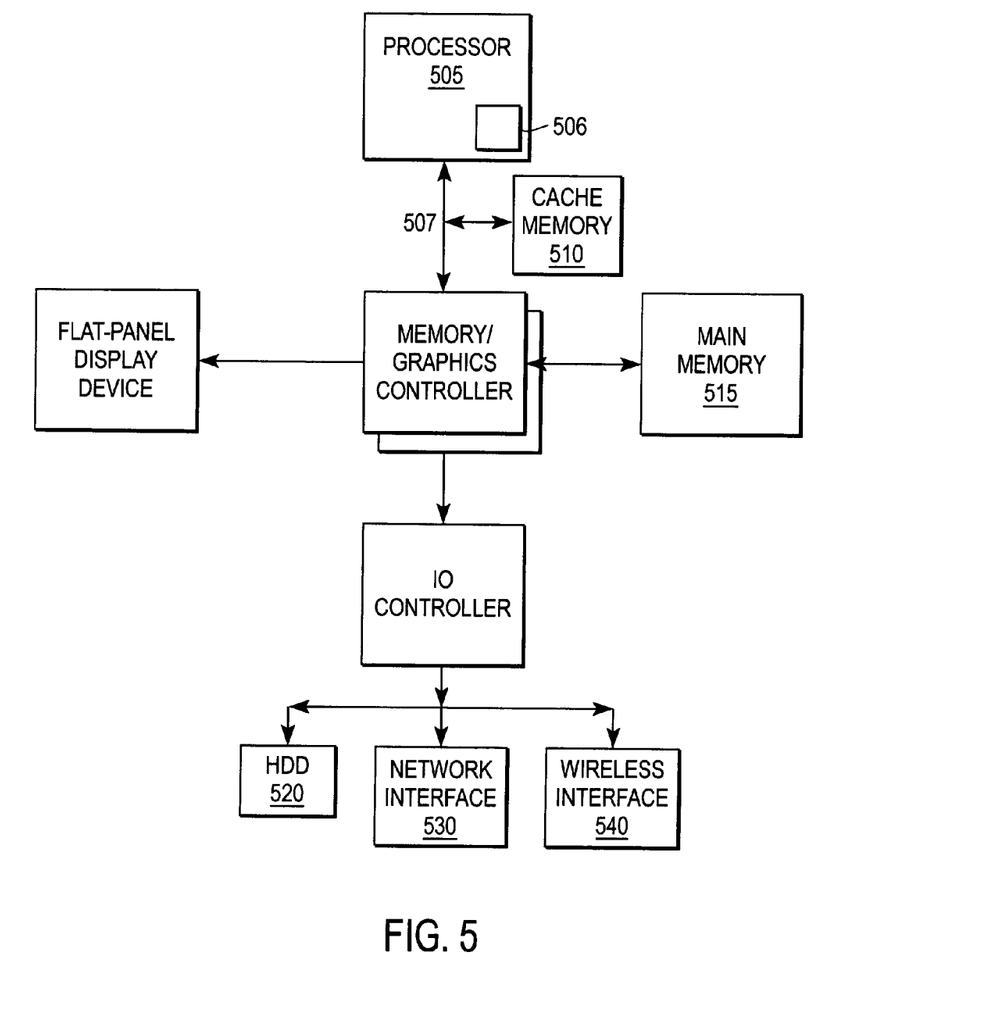
FIG. 5 illustrates a computer system having a shared bus architecture, in which one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is one embodiment 506. The processor may have any number of processing cores. Other embodiments, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. Within, or at least associated with, each bus agent may be at least one embodiment of invention 506, Alternatively, an embodiment of the invention may be located or associated with only one of the bus agents of FIG. 5, or in fewer than all of the bus agents of FIG. 5.

Figure 6:
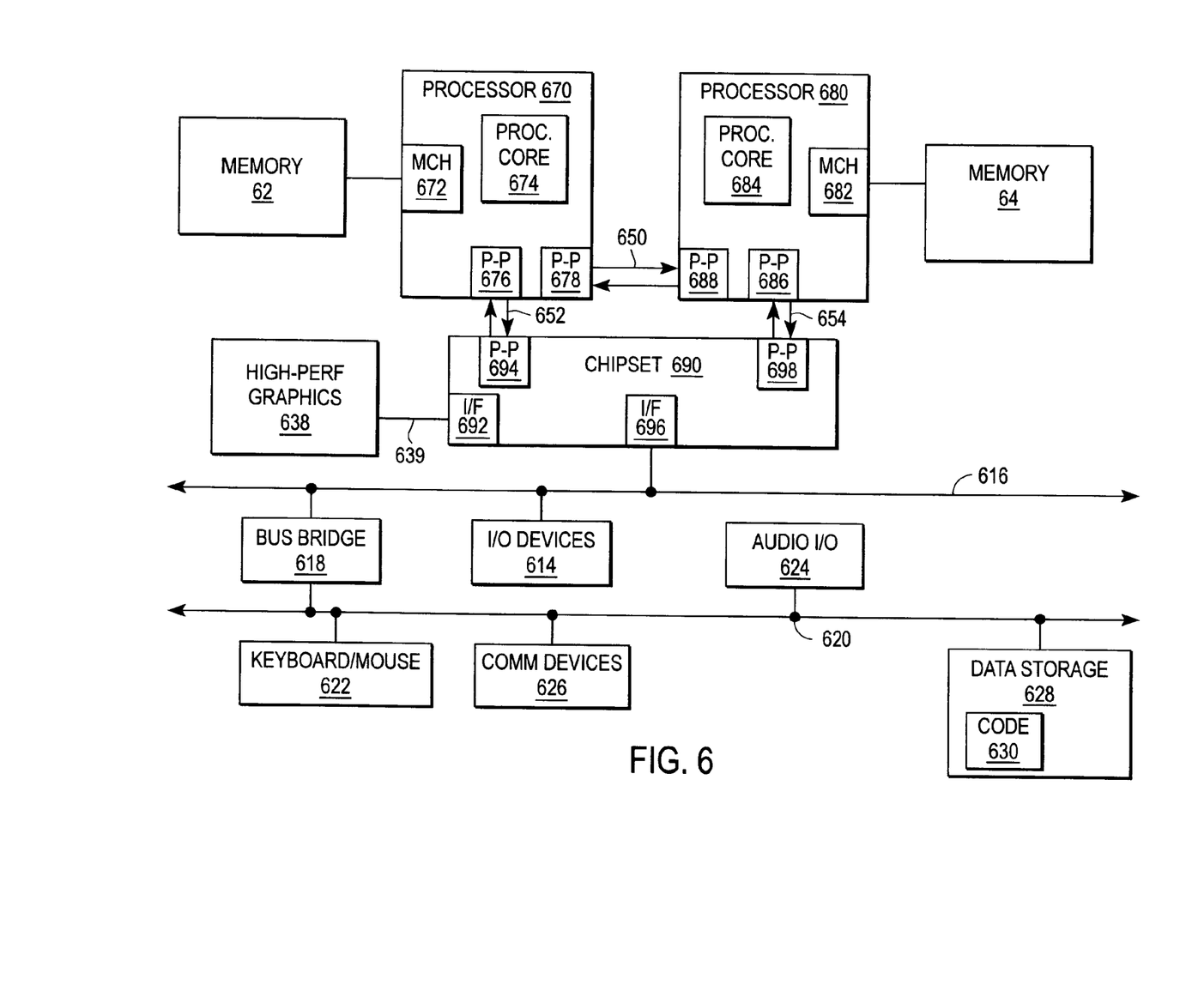
FIG. 6 illustrates a computer system having a point-to-point bus architecture, in which one embodiment of the invention may be used.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670 and 680 are shown for clarity. Processors 670 and 680 may each include a local memory controller hub (MCH) 672 and 682 to connect with memory 22, 24. Processors 670 and 680 may exchange data via a point-to-point (PtP) interface 650 using PtP interface circuits 678 and 688. Processors 670 and 680 may each exchange data with a chipset 690 via individual PtP interfaces 652 and 654 using point to point interface circuits 676, 694, 686 and 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, other embodiments of the invention may be distributed throughout several circuits, logic units, or devices illustrated in FIG. 6.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
a pre-coherence channel;
one or more cache agents coupled to the pre-coherence channel to communicate messages corresponding to cache operations including requests, writebacks, snoop data hit messages, snoop no data messages, and data acknowledgements;
a protocol agent coupled to the pre-coherence channel to receive the messages, wherein the protocol agent is separated from the one or more cache agents, wherein at least one of a request followed by a writeback, the request followed by a snoop data hit message, and the request followed by a snoop no data message on the pre-coherence channel is re-ordered to avoid deadlock, wherein a data acknowledgment is capable to trigger a coherence protocol to enter a conflict phase, and wherein ordering at least one of a snoop data hit message followed by the data acknowledgement, and a snoop no data message followed by the data acknowledgement is communicated on the pre-coherence channel to ensure conflicts are properly detected.

2. The apparatus of claim 1 further comprising an ingress first-in-first-out (FIFO) buffer to store the messages in an order in which messages are received.

3. The apparatus of claim 2 wherein the ingress FIFO buffer is part of the protocol agent.

4. The apparatus of claim 1 wherein the pre-coherence channel includes a local on-chip network to transfer the messages from a cache agent to the protocol agent in an ordered fashion.

5. The apparatus of claim 1 wherein internal ordering of cache operations is communicated by a logic in a cache agent onto a local on-chip network.

6. The apparatus of claim 1 wherein the pre-coherence channel is a virtual path to transfer internal ordering of cache operations between a pair of a cache agent and the protocol agent that handle the cache operations, the virtual path being formed by a communication logic at the cache agent, a network connecting the cache agent to the protocol agent, and an ingress FIFO logic at the protocol agent.

7. The apparatus of claim 1, wherein the protocol agent allows at least one of the messages corresponding to a cache operation to be reordered on the pre-coherence channel.

8. The apparatus of claim 7, wherein the protocol agent ignores effects of at least one of the messages that is being reordered when the at least one of the messages becomes out of order.

9. The apparatus of claim 8, wherein the protocol agent recovers from the effects of one or more re-ordered messages that became out-of-ordered if re-ordering causes an inconsistent coherence protocol view across the cache agent, the protocol agent, or another protocol agent in the system.

10. The apparatus of claim 1 further comprising:
an inflight table; and
an arbiter to arbitrate access to the inflight table between outputs of an ingress first-in-first-out (FIFO) buffer and a second FIFO buffer.

11. The apparatus of claim 10 wherein the inflight table handles ignoring and recovery of re-ordered messages.

12. The apparatus of claim 11 further wherein the ingress FIFO buffer is configured to store the messages in an order in which the messages are received.

13. The apparatus of claim 12 wherein the ingress FIFO buffer is part of a chip multi processor (CMP) network.

14. The apparatus of claim 12 further wherein the ingress FIFO buffer is part of the protocol agent.

15. The apparatus of claim 12 wherein the second FIFO buffer has an input coupled to receive a cache operation related request from the output of the ingress FIFO buffer when a cache operation-related request is blocked from proceeding.

16. The apparatus of claim 15 wherein moving of the blocked cache operation-related request form the ingress FIFO buffer into the second FIFO buffer allows resolution of a cyclic resource dependency between the blocked cache request and at least one other cache operation message in the pre-coherence channel.

17. The apparatus of claim 16 wherein the ingress FIFO buffer stores the blocked cache-operation related request and blocks other cache messages following the blocked cache operation-related request in the pre-coherence channel, until an acyclic resource dependency is resolved.

18. The apparatus of claim 16 wherein the ingress FIFO buffer stores the blocked cache operation-related request with a blocked resource, and blocks one or more other cache messages following the blocked cache operation related request in the pre-coherence channel, until a flow control dependency is resolved by virtue of pre-allocation of the resource at its target.

19. The apparatus of claim 12 where pre-coherence channel consists of an ordered mechanism to transport cache messages from the cache agent into the protocol agent, wherein the ordered mechanism includes recovery and ignore mechanisms to allow a consistent coherence view of the system, and a mechanism where resource dependencies are resolved by blocking the pre-coherence channel or moving the blockage to the second FIFO buffer to unblock the pre-coherence channel.

20. A system comprising:
a microprocessor comprising a network by which to receive messages including requests, writebacks, snoop data hit messages, snoop no data messages, and data acknowledgements corresponding to cache operations from a set of cache agents, wherein at least one of a request followed by a writeback, the request followed by a snoop data hit message, and the request followed by a snoop no data message on the network are re-ordered to avoid deadlock, wherein a data acknowledgment is capable to trigger a coherence protocol to enter a conflict phase, and wherein ordering at least one of a snoop data hit message followed by the data acknowledgement, and a snoop no data message followed by the data acknowledgement is communicated on the pre-coherence channel to ensure conflicts are properly detected, wherein the network is configured to transport the messages to a protocol agent separated from the set of the cache agents; and
a memory coupled to the microprocessor.

21. The system of claim 20 further comprising an ingress first-in-first-out (FIFO) buffer to store the messages in an order in which the messages are received.

22. The system of claim 21 wherein moving of the request, which is blocked, from the ingress FIFO buffer into a second FIFO buffer allows resolution of a cyclic resource dependency between the blocked request and at least one other message that corresponds to a cache operation in a pre-coherence channel.

23. The system of claim 22 wherein the ingress FIFO buffer stores the blocked request and blocks other messages corresponding to cache operations following the blocked request in the pre-coherence channel, until an acyclic resource dependency is resolved.

24. The system of claim 22 wherein the ingress FIFO buffer stores the blocked request that corresponds to the cache operation with a blocked resource, and blocks one or more other messages corresponding to cache operations following the blocked request in the pre-coherence channel, until a flow control dependency is resolved by virtue of preallocation of the resource at its target.

25. The system of claim 20 wherein the network is a pre-coherence channel that consists of an ordered mechanism to transport the messages corresponding to cache operations from the cache agent into the protocol agent, wherein the ordered mechanism includes recovery and ignore mechanisms to allow a consistent coherence view of the system, and a mechanism where resource dependencies are resolved by blocking the pre-coherence channel or moving the blockage to another FIFO buffer to unblock the pre-coherence channel.

26. A processor comprising:
a pre-coherence channel; and
a local network of cache agents coupled to the pre-coherence channel to communicate messages corresponding to cache operations at the local network of cache agents including the requests, the writebacks, the snoop data hit messages, the snoop no data messages, and the data acknowledgements, wherein at least one of a request followed by a writeback, the request followed by a snoop data hit message, and the request followed by a snoop no data message on the pre-coherence channel are re-ordered to avoid deadlock, wherein a data acknowledgment is capable to trigger a coherence protocol to enter a conflict phase, and wherein ordering at least one of a snoop data hit message followed by the data acknowledgement, and a snoop no data message followed by the data acknowledgement is communicated on the pre-coherence channel to ensure conflicts are properly detected, wherein the protocol agent is separate from the cache agents.

27. The processor of claim 26 further comprising an ingress first-in-first-out (FIFO) buffer to store the messages in an order in which the messages are received.

28. The processor of claim 26 wherein the pre-coherence channel comprises an ordered mechanism to transport the messages from the cache agents into the protocol agent, wherein the ordered mechanism includes recovery and ignore mechanisms to allow a consistent coherence view of the system, and a mechanism where resource dependencies are resolved by blocking the pre-coherence channel or moving the blockage to another FIFO buffer to unblock the pre-coherence channel.

* * * * *